(12) United States Patent
Horn

(10) Patent No.: US 7,737,856 B2
(45) Date of Patent: Jun. 15, 2010

(54) SYSTEM AND METHOD FOR MONITORING A PLURALITY OF TRANSCEIVERS

(75) Inventor: Thomas Horn, Langenstein (DE)

(73) Assignee: Data-Complex GmbH, Halberstadt (DE)

( * ) Notice: Subject to any disclaimer, the term of this patent is extended or adjusted under 35 U.S.C. 154(b) by 614 days.

(21) Appl. No.: 11/638,865

(22) Filed: Dec. 14, 2006

(65) Prior Publication Data

US 2008/0143510 A1 Jun. 19, 2008

(51) Int. Cl.
*G08B 13/14* (2006.01)
(52) U.S. Cl. .............................. 340/572.4; 340/686.1
(58) Field of Classification Search .............. 340/572.1, 340/572.4, 572.7, 572.8, 10.1, 686.1, 687, 340/686.6; 342/450, 463–465
See application file for complete search history.

(56) References Cited

U.S. PATENT DOCUMENTS

| | | | |
|---|---|---|---|
| 6,784,802 B1 * | 8/2004 | Stanescu | 340/687 |
| 7,436,310 B2 * | 10/2008 | Flaster et al. | 340/572.8 |
| 2006/0165039 A1 * | 7/2006 | Lyon et al. | 370/334 |
| 2007/0197086 A1 * | 8/2007 | Horn | 439/540.1 |
| 2007/0221730 A1 * | 9/2007 | McReynolds et al. | 235/385 |
| 2008/0100456 A1 * | 5/2008 | Downie et al. | 340/572.8 |

\* cited by examiner

*Primary Examiner*—Thomas J Mullen
(74) *Attorney, Agent, or Firm*—Dicke, Billig & Czaja, PLLC

(57) ABSTRACT

A system for and a method of monitoring a plurality of transceivers is disclosed. In one embodiment the method includes enabling one transceiver of the plurality of transceivers. The method also includes disabling all other transceivers of the plurality of transceivers. A transmit coil emits a high frequency electromagnetic field, the one transceiver transmitting a signal in response to the field of the transmit coil. At least one of a plurality of reader coils receives the signal transmitted by the one transceiver, the plurality of reader coils being suitably arranged in the vicinity of the area to be monitored. An evaluator determines a position of the one transceiver from the signal received from the one transceiver by the at least one of the plurality of reader coils.

9 Claims, 3 Drawing Sheets

17
12
14

27
22
24

37
32
34

47
42
44

SYSTEM AND METHOD FOR MONITORING A PLURALITY OF TRANSCEIVERS

BACKGROUND

The invention relates to a system for and a method of monitoring a plurality of transceivers located in an area, e.g. a patch panel, to be monitored.

Data networks serve, inter alia, to provide data links to a larger number of computers, e.g. PCs or work stations, etc., or the staff sitting there, i.e. the users of the data network. The users at the work stations are thus provided with individual services, e.g. with data services or also telecommunication services. In order to achieve this, the data networks have central distributor points, mostly distributor cabinets. Patch panels are provided in the distributor points. These patch panels have ports, i.e. connections. From the ports of these patch panels data cables route data links to the work stations, e.g. in a star pattern.

There are also active devices located in the distributor cabinets or distributor points besides the patch panels. These active devices serve to distribute the data, telephone signals or other applications.

The connection of e.g. the active devices to the patch panels is achieved with patch cables.

These patch cables have a plug at each end. This plug can be inserted into a port or connection on a patch panel. The patch cables are e.g. 8-wired, flexible and e.g. about 0.5 m to 5 m long. In the case of copper cables, the plugs are generally so-called RJ45 plugs; further, optical fibers have been ready-made with various plugs.

To now supply a PC/work station with the desired services or to make these services available thereto, the active device must be connected accordingly to the corresponding port on the patch panel. If, for example, a user needs a telephone connection as well as a data link, then the telephone system and a data switch system are made available for use by connecting the corresponding ports to the active device.

In the case of changes to services, relocations, transfers or other reorganization measures, it may become necessary to make changes to these connections at the distributors. In this case, "patch rearrangement" must be conducted. Thus, patch cables must be re-plugged in keeping with the services required from now on.

A series of problems arise as a result of this. A plurality of patch cables cover the individual patch panels and also become entwined with one another. Connections that are no longer required still remain patched in some instances. Thus, the clarity of overview in the case of medium and large installations necessarily decreases drastically in some cases. These problems result in errors and time losses in conducting re-patching operations. This in turn leads to an increase in work time for the responsible administrator, as well as for the users, until the services are truly available by reworking. The possibility of damages to the devices or even the completely unintended outage of services as a result of incorrect patching should not be excluded.

Arrangements for monitoring patch panels at distributor points in data networks are proposed in, for example, U.S. Pat. No. 6,784,802, DE 102 44 304 B3, and DE 10 2004 052 502 A1.

U.S. Pat. No. 6,784,802 provides a system and a method for monitoring connectivity in a cable system including radio frequency identification (RFID) transceivers on cable ends and RFID sensors at connection points. The RFID sensors are connected to a central monitoring system. Presence of a particular cable end at a particular connection point is detected and recorded by the central monitoring system.

DE 102 44 304 B3 relates to an arrangement for monitoring patch panels, the arrangement including patch cables which can be inserted into the connections in the patch panels by means of a plug. Each plug is fitted with a transponder. Readers with reader spools are also provided. Each connection attachment in a patch panel is fitted with a reader spool or with a reader.

DE 10 2004 052 502 A1 describes an arrangement for monitoring patch fields, the arrangement including patch cables which can be plugged by means of plugs into connectors in the patch fields. Each of the two plugs of each cable is provided with a transponder. A device is arranged before or in the proximity of one of the patch fields with its connectors. The device is equipped with readers and reader coils. The readers are in data communication with an evaluation unit. The device comprises a plurality of reader coils, the number of which exceeds the number of connectors in the patch field. The reader coils can be independently driven.

Thus, known systems or methods only check if one of a plurality of predetermined positions, i.e. possible connection positions, is occupied by a respective plug having a transceiver. With increasing dimension of patch panels it could be desirable, however, to determine the position of the particular connector/plug independent from any predetermined connector positions. In particular, it may be desirable to determine a position of a transceiver of a plurality of transceivers, independent from the arrangement and use of the transceivers. For these or other reasons, there is a need for the present invention.

SUMMARY

In accordance with an aspect of the invention, there is provided a method for monitoring a plurality of transceivers located in an area to be monitored. The method includes enabling one transceiver of the plurality of transceivers, and disabling all other transceivers of the plurality of transceivers. A transmit coil emits a high frequency electromagnetic field, the one transceiver transmitting a signal in response to the field of the transmit coil. At least one of a plurality of reader coils receives the signal transmitted by the one transceiver, the plurality of reader coils being suitably arranged in the vicinity of the area to be monitored. An evaluator determines a position of the one transceiver from the signal received from the one transceiver by the at least one of the plurality of reader coils.

In accordance with a further aspect of the invention, there is provided a system for monitoring a plurality of transceivers located in an area to be monitored. The system includes at least one transmit coil for emitting a high frequency electromagnetic field, an enabled transceiver of the plurality of transceivers transmitting a signal in response to the field of the transmit coil, and a disabled transceiver of the plurality of transceivers not transmitting a signal in response to the field of the transmit coil, and at least one reader having a plurality of reader coils for receiving the signal transmitted by the enabled transceiver.

Further features, aspects and advantages of the present invention will become apparent from the following detailed description of the invention made with reference to the accompanying drawings.

BRIEF DESCRIPTION OF THE DRAWINGS

The accompanying drawings are included to provide a further understanding of the present invention and are incorporated in and constitute a part of this specification. The drawings illustrate embodiments of the present invention and together with the description serve to explain the principles of the invention. Other embodiments of the present invention and many of the intended advantages of the present invention will be readily appreciated as they become better understood by reference to the following detailed description.

DETAILED DESCRIPTION

In the following detailed description, reference is made to the accompanying drawings, which form part hereof, and in which is shown by way of illustration specific embodiments in which the invention may be practiced. It is to be understood that other embodiments may be utilized and structural or other changes may be made without departing from the scope of the present invention. The following detailed description, therefore, is not to be taken in a limiting sense, and the scope of the present invention is defined by the appended claims.

The localization of a plurality of transceivers, as will be described below, is independent from the type of assembly of the plurality of transceivers. The assembly of the plurality of transceivers may be linear, circular, or of any other shape. Only to simplify matters, a linear assembly of transceivers is assumed in the following.

Figure 1:
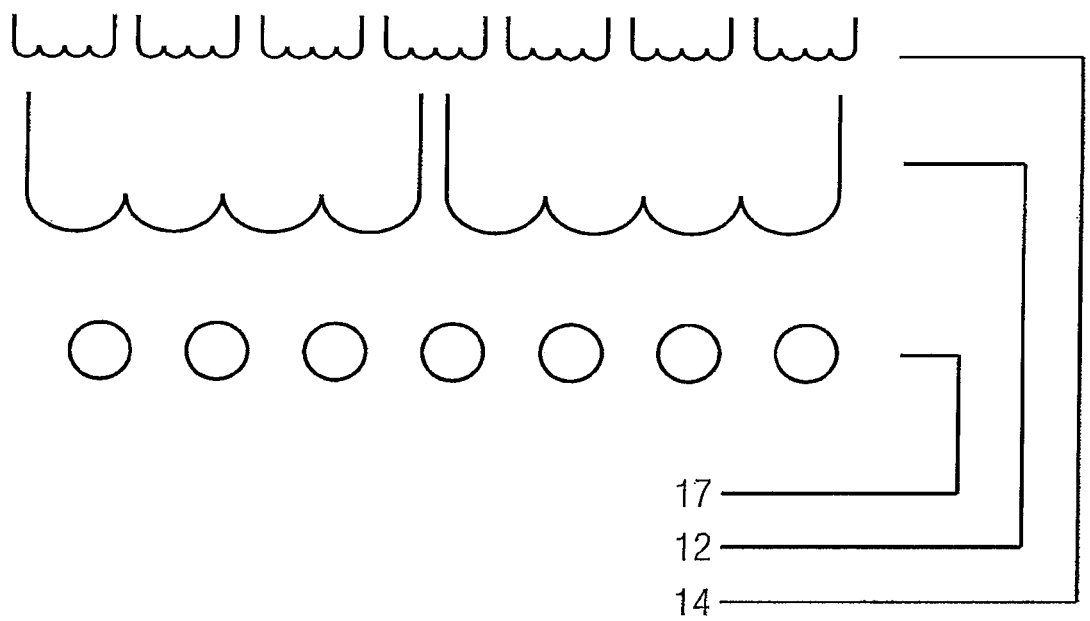
FIG. 1 illustrates a simplified schematic drawing of a system according to an embodiment of the invention.

FIG. 1 shows a simplified schematic drawing of a system according to an embodiment of the invention. To facilitate a better understanding of a first approach of how to localize a plurality of transceivers 17, the system according to the embodiment of the invention is shown in a simplified way with only the plurality of transceivers 17, at least one transmit coil 12 (here: e.g. two transmit coils 12), and a plurality of reader coils 14 being illustrated.

As already stated above, the transceivers 17 are arranged linearly and therefore, the plurality of reader coils 14 are also arranged linearly, the most convenient arrangement, but other types of arrangements are also possible. At least one transmit coil 12 is provided for generating a capacious transmit field. The transmit field of one transmit coil 12 reaches several transceivers or may even reach all transceivers 17 of the assembly.

In certain embodiments of the invention, signals including instructions for enabling and/or disabling a particular transceiver(s) or other types of instructions may be also transmitted by means of the transmit field.

For a localization of one particular transceiver of the plurality of transceivers 17, the particular transceiver has to be enabled whereas all other transceivers of the plurality of transceivers have to be disabled. Techniques for enabling/disabling one or more transceivers of a plurality of transceivers 17 are well-known in the art: For example, a transmit coil 12 transmits a carrier frequency, e.g. a radio carrier frequency, providing the transceivers within its transmit field with energy. The transceivers within the transmit field of a transmit coil 12 may then send, based on the carrier frequency of the transmit coil 12, on a side band of the carrier frequency, e.g. by single side band modulation. Further, each transceiver has a unique serial number which can be used for identification. For example, to determine the serial numbers of the transceivers within its transmit field, a transmit coil 12 may send a REQUEST command to all transceivers within its transmit field causing the transceivers to send their respective serial numbers. To avoid collisions of the response signals sent by the transceivers, e.g., a slotted ALOHA protocol or a dynamic S-ALOHA protocol, may be used. When the serial number of a particular transceiver is known, the particular transceiver may be selected and enabled by a SELECT(SNR) command which includes the serial number (SNR) of the particular transceiver as parameter. All other transceivers are in a so-called "quiet" state, which means that they do not send any signals and only respond to a REQUEST command, whereas the particular enabled transceiver may transmit a signal in response to the transmit field of an activated transmit coil 12. The signal sent by the particular transceiver may comprise additional information such as an identity code, but for the purposes of localization it is sufficient for the particular transceiver to transmit a signal without any additional information.

After the enabled transceiver sends the signal, a further transceiver is enabled and the other transceivers (including the previously enabled transceiver) are put into the quiet state. The enabled further transceiver transmits a signal in response to the transmit field of the activated transmit coil 12. Then the process starts anew and the above described steps are reiterated for each of the several transceivers which are in the range of the transmit field of the activated transmit coil.

If there is more than one transmit coil provided the above described steps are reiterated for each of the several transceivers which are reached by a transmit field of a further transmit coil which is activated next.

In the embodiment shown in FIG. 1, there are more reader coils than transmit coils provided and the reader coils are arranged in a linear fashion next to each other. When a transceiver is activated and sends a signal in response to the transmit field the reader coils are tested successively for reception of the transceiver signal.

As the signal level of the transceiver signal decreases with increasing distance from the transceiver, the reader coils receive signals having varying signal levels. Thus, the nearest reader coil receiving the highest signal level indicates the location of the transceiver.

An additional way to locate the transceiver which is also based on its signals received by the reader coils works without evaluating the signal levels. Herein, there is only determined which reader coils of the plurality of reader coils receive the transceiver signal. If more than one reader coil receives the transceiver signal the transceiver will be located in the center of these reader coils receiving the signal. Otherwise, the single transmit coil reaching the selected transceiver indicates the location of the latter. For example, given a linear assembly of both the transceivers and reader coils, if six reader coils receive the transceiver signal the transceiver will be located between the third and fourth one of the six reader coils.

Hereby, a homogeneous arrangement of all transmit and reader coils is appropriate if not mandatory.

Both methods described above may be combined to achieve an even higher level of precision.

Figure 2:
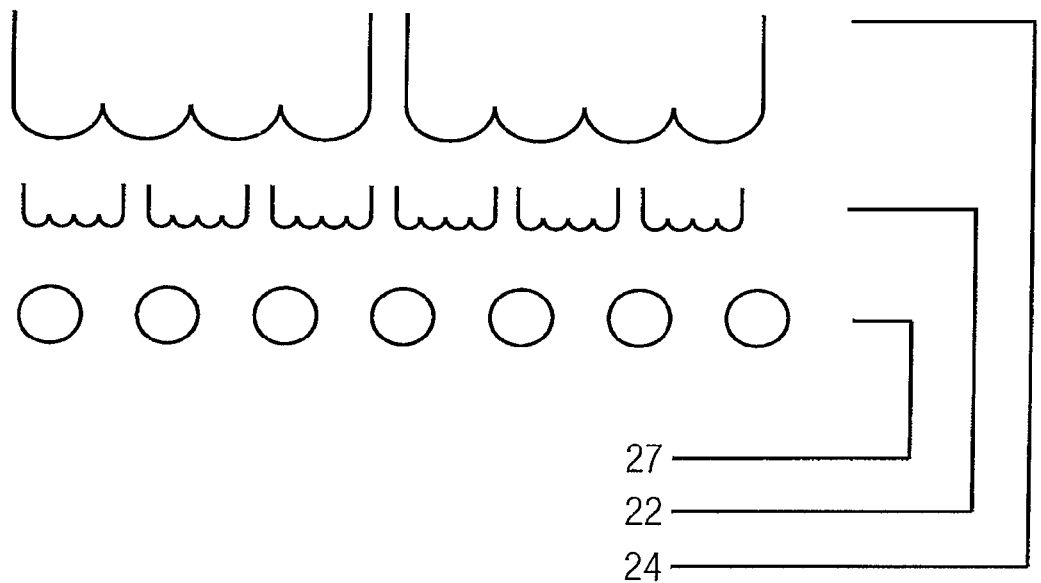
FIG. 2 illustrates a simplified schematic drawing of a system according to a further embodiment of the invention.

FIG. 2 shows a simplified schematic drawing of a system according to a further embodiment of the invention. To facilitate a better understanding of a second approach of how to localize a plurality of transceivers 27, the system according to the further embodiment of the invention is shown in a simplified way with only the plurality of transceivers 27, a plurality of transmit coils 22, and at least one reader coil 24 (here: e.g. two reader coils 24) being illustrated.

The transceivers 27 are arranged linearly and therefore, the plurality of transmit coils 24 are also arranged linearly, the most convenient arrangement, but other types of arrangements are also possible. One of the e.g. two reader coils 24 covers a wide area, in particular, one reader coil covers a larger area than one transmit coil of the plurality of transmit coils 22. In some embodiments one single reader coil may cover the whole area to be detected, i.e. all transceivers.

The selection of a transceiver, i.e. one transceiver is enabled whereas all other transceivers are disabled, is analogous to the selection of a particular transceiver described with reference to FIG. 1.

Each of the plurality of transmit coils 22 emits in sequential order a transmit field to activate and cause a respective selected transceiver to send a signal.

If the transmit field of a respective transmit coil reaches the selected transceiver the transceiver sends a signal in response which is received by the at least one reader coil. By determining which transmit coils reach (i.e., are in the range of) the selected transceiver and by evaluating the location of these transmit coils, the selected transceiver can be located: If more than one transmit coil reaches (i.e., are in the range of) the selected transceiver the selected transceiver will be located in the center of these transmit coils. Otherwise, the single transmit coil reaching the selected transceiver indicates the location of the latter.

In another embodiment of the invention, there may be a plurality of transmit coils and a plurality of reader coils provided and thus, the methods of FIGS. 1 and 2 are used in a combined fashion.

Figure 3:
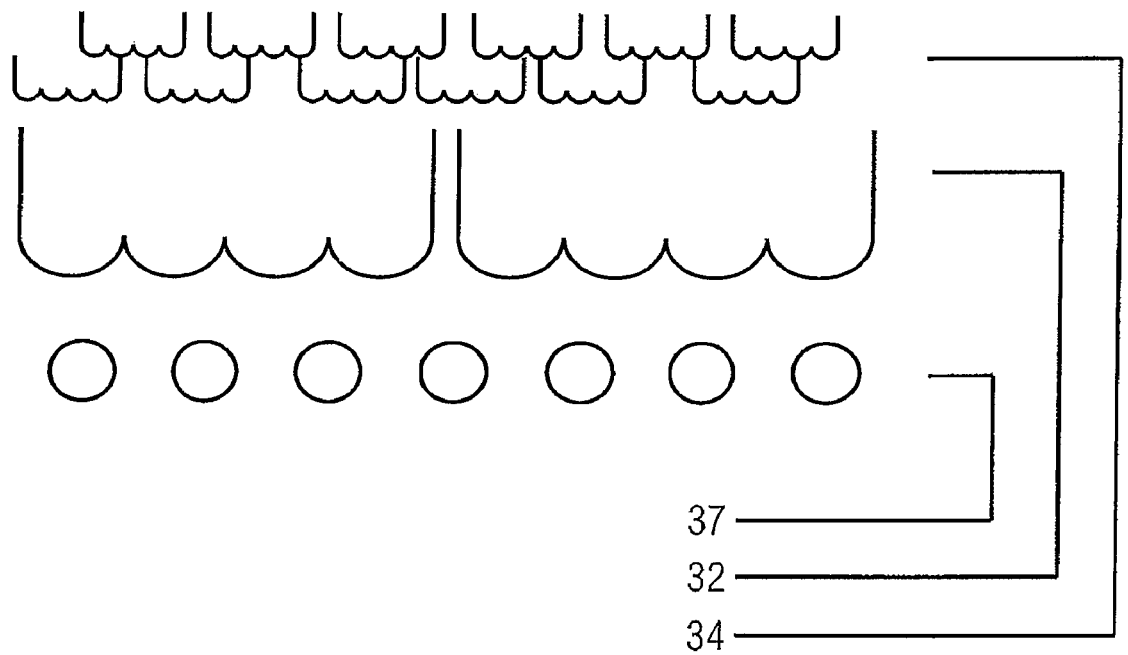
FIG. 3 illustrates a simplified schematic drawing of a system according to a further embodiment of the invention.

FIG. 3 shows a simplified schematic drawing of a system according to a further embodiment of the invention. The system of FIG. 3 is analogous to the one of FIG. 1 apart from the arrangement of the reader coils 34. Here, the reader coils 34 are arranged in an overlapping fashion, which further increases the level of precision relative to the arrangement of FIG. 1.

Figure 4:
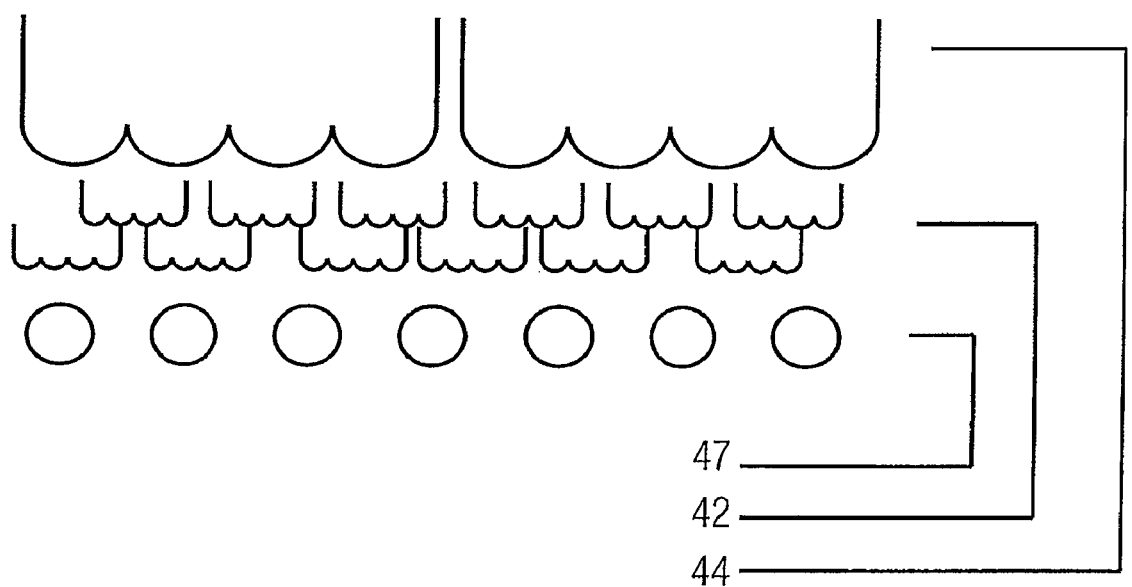
FIG. 4 illustrates a simplified schematic drawing of a system according to a further embodiment of the invention.

FIG. 4 shows a simplified schematic drawing of a system according to a further embodiment of the invention. The system of FIG. 4 is analogous to the one of FIG. 2 apart from the arrangement of the transmit coils 42. Here, the transmit coils 42 are arranged in an overlapping fashion, which further increases the level of precision relative to the arrangement of FIG. 2.

Figure 5:
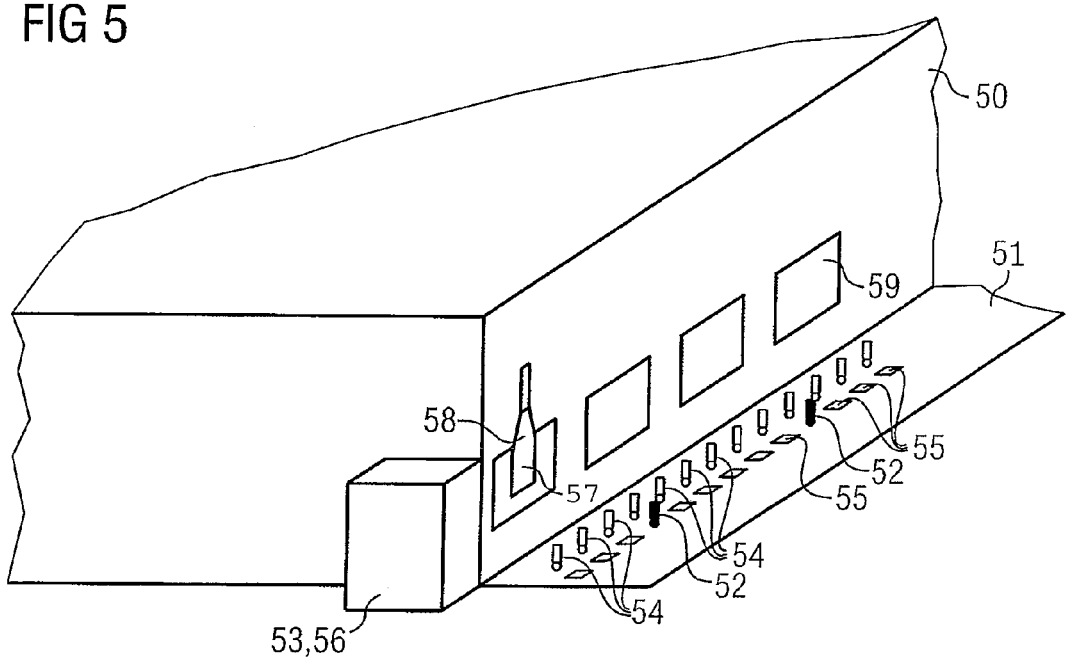
FIG. 5 illustrates a schematic representation of an application of a system according to a further embodiment of the invention.

FIG. 5 shows a schematic representation of a system according to a further embodiment of the invention which is used, in this case, to monitor a patch panel 50.

There is shown the patch panel 50 with a plurality of connections 59, also referred to as ports. These connections 59 allow patch cables with their plugs 58 to be inserted. Each plug 58 is fitted with a transceiver 57.

The patch cables may serve to supply the patch panels amongst themselves or with specific service devices such as telephone connections. Naturally, a patch cable has two ends, each of which is fitted with a plug 58 having a transceiver 57.

Further, there is shown a rectangular plate or cover plate 51 including a plurality of transmit coils 52, several reader coils 54, a reader 53 with its reader electronics 56, and indicators 55. For a subsequent fitting of already existing patch panels 50 it is advantageous if a cover plate 51 is provided that supports the reader(s) 53, transmit 52 and reader coils 54, and indicators. This cover plate 51 can be simply placed in front of or adjacent to the patch panel 50.

A transceiver 57 has an electric circuit and a coil and is, in general, very small. The circuit consists of only a chip and contains no power supply of its own.

Because of the small dimensions of only a few millimeters, transceiver 57 has sufficient space on or in the plug and can thus be located in the plug 58 or, where fitted subsequently, on the plug 58 of a patch cable without any problem. On original manufacture the transceiver 57 would be injection moulded with the plug 58 or in the plastic around the plug 58, but in the case of retrofit it can be attached to the outside of the plug 58 without any problem.

A reader 53 is an electronic circuit known per se, which has at least one coil in the form of a reader coil 54. This coil has a specific inductivity. The electronic circuit of the reader 53 is able to recognize and evaluate fluctuations in the magnetic field of its coils.

The reader 53 can have several coils. This is actually preferred for the reason of cost. The reader 53 can then recognize and evaluate fluctuations of the magnetic fields of its different coils by switchover from coil to coil.

It is therefore possible to use a reader 53 having one reader coil 54 only. However, it is preferred that several reader coils 54 are combined and belong to a joint reader 53, which then feeds several coils, possibly even all reader coils for the entire patch panel 50.

There are a plurality of transmit coils 52 provided for transmitting high frequency electromagnetic fields activating the transceivers 57 of the plugs 58.

After insertion of the plug 58 into the connection 59 of the patch panel 50, the transceiver 57 is therefore located with its coil in the magnetic field of one of the transmit coils 52, so that the magnetic fields of the coil of transceiver 57 and one of the transmit coils 52 influence one another or build up. The magnetic field of one of the transmit coils 52 influences the magnetic field of the coil of the transceiver 57 to provide a supply current for the circuit of the transceiver 57. Therefore, an interaction occurs between the transceiver 57 and one of the transmit coils 52 such that the transceiver coil transmits an electromagnetic wave, a signal.

This signal sent in response to the one of the transmit coils 52 is received by a reader coil 54 of a reader 53 as a change in the magnetic field within the reader coil 54, and is recognized, evaluated, and forwarded by the reader 53 accordingly. It then passes these data, for example, to an evaluation unit or a management console.

The evaluation unit or a management console may stand at another, possibly also far removed, location to allow remote monitoring.

The control of the circuits of the readers 53 may be organized by microcontrollers. In this case, microcontrollers would control the entire course of the switchover of the coils, transmit coils 52 as well as reader coils 54, the control of the readers 53, the readout of the data of the reader 53 and also the forwarding of these data to the evaluation unit or a management console via a data network.

An indicator, in particular a light-emitting diode (LED), is preferably arranged at each reader coil 54. Any necessary re-plugging can then be identified by an indicator, e.g. an illuminated LED, so that one can recognize in the simplest manner, which of the numerous connections is currently selected. In the case of an error, i.e. an incorrectly plugged cable, the LED can flash, for example.

It is advantageous if active devices, which can be connected to the patch panel, also have connections, which are fitted with reader coils and transmit coils.

The necessary components are all very inexpensive, the readers, transceivers and the microcontrollers, and only increase the production costs slightly.

Further, optical fiber cables can be used, in particular, optical fiber cables without an additional copper shielding continuity wire when monitoring the connections/plugs by means of a system according to the invention.

While certain exemplary embodiments of the invention have been described above in detail and shown in the accompanying drawings, it is to be understood that such embodiments are merely illustrative of and not restrictive of the broad invention. It will thus be recognized that various modifications may be made to the illustrated and other embodiments of the invention described above, without departing from the broad inventive scope thereof. In the view of the above it will be understood that the invention is not limited to the particular embodiments or arrangements disclosed, but it is rather intended to cover any changes, adaptations or modifications which are within the scope and spirit of the invention as defined by the appended claims.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A system for monitoring a plurality of transceivers located in an area to be monitored, the system comprising:
   means for enabling one transceiver of the plurality of transceivers and disabling all other transceivers of the plurality of transceivers;
   a transmit coil for emitting a high frequency electromagnetic field, the one transceiver transmitting a signal in response to the field of the transmit coil;
   at least one reader having a plurality of reader coils for receiving the signal transmitted by the one transceiver, the plurality of reader coils being suitably arranged in the vicinity of the area to be monitored; and
   an evaluator for determining a position of the one transceiver from the signal received from the one transceiver by the plurality of reader coils, wherein the evaluator is configured to determine the position of the one transceiver from the signal received from the one transceiver by comparing the levels of the signal received by the plurality of reader coils from the one transceiver.

2. The system of claim 1, wherein the evaluator is configured to determine the position of the one transceiver from the signal received from the one transceiver by the plurality of reader coils by analyzing which reader coils of the plurality of reader coils receive the signal transmitted by the one transceiver and by further analyzing positions of the reader coils which receive the signal transmitted by the one transceiver.

3. The system of claim 1, wherein the area to be monitored is a patch panel at distributor points in data networks, the patch panel having connectors connectable with plugs, each plug comprising one of the plurality of transceivers.

4. The system of claim 3, wherein a rectangular plate or cover is provided, in which the transmit coil, the at least one reader, and the plurality of reader coils are arranged and which can be positioned in front of or near the patch panel.

5. The system of claim 1, wherein each reader coil is provided with an indicator.

6. A method for monitoring a plurality of transceivers located in an area to be monitored, the method comprising:
   enabling one transceiver of the plurality of transceivers;
   disabling all other transceivers of the plurality of transceivers;
   a transmit coil emitting a high frequency electromagnetic field, the one transceiver transmitting a signal in response to the field of the transmit coil;
   a plurality of reader coils receiving the signal transmitted by the one transceiver, the plurality of reader coils being suitably arranged in the vicinity of the area to be monitored; and
   an evaluator determining a position of the one transceiver from the signal received from the one transceiver by the plurality of reader coils, wherein the evaluator determines the position of the one transceiver from the signal received from the one transceiver by comparing the levels of the signal received by the plurality of reader coils from the one transceiver.

7. The method of claim 6, wherein the evaluator determines the position of the one transceiver from the signal received from the one transceiver by the plurality of reader coils by analyzing which reader coils of the plurality of reader coils receive the signal transmitted by the one transceiver and by further analyzing positions of the reader coils which receive the signal transmitted by the one transceiver.

8. The method of claim 6, wherein the area to be monitored is a patch panel at distributor points in data networks, the patch panel having connectors connectable with plugs each plug comprising one of the plurality of transceivers.

9. A system for monitoring a plurality of transceivers located in an area to be monitored, the system comprising:
   at least one transmit coil for emitting a high frequency electromagnetic field, an enabled transceiver of the plurality of transceivers transmitting a signal in response to the field of the transmit coil, and a disabled transceiver of the plurality of transceivers not transmitting a signal in response to the field of the transmit coil;
   at least one reader having a plurality of reader coils for receiving the signal transmitted by the enabled transceiver; and
   an evaluator for determining a position of the enabled transceiver from the signal received from the enabled transceiver by the plurality of reader coils, wherein the evaluator is configured to determine the position of the enabled transceiver by comparing the levels of the signal received by the plurality of reader coils from the enabled transceiver.

* * * * *